(12) United States Patent
Ohno et al.

(10) Patent No.: US 7,937,730 B2
(45) Date of Patent: May 3, 2011

(54) RECORDING CONTROL APPARATUS AND CONTROL METHOD THEREOF

(75) Inventors: Tomoyuki Ohno, Zama (JP); Yoshikazu Shibamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 12/060,598

(22) Filed: Apr. 1, 2008

(65) Prior Publication Data

US 2008/0250457 A1 Oct. 9, 2008

(30) Foreign Application Priority Data

Apr. 4, 2007 (JP) ................................ 2007-098684

(51) Int. Cl.
*H04N 5/445* (2011.01)
(52) U.S. Cl. ................ 725/58; 725/44; 725/45; 725/89; 725/134; 725/142; 386/46; 386/83
(58) Field of Classification Search .................... 386/46, 386/83, 95; 725/58, 44, 45, 89, 134, 142
See application file for complete search history.

(56) References Cited

U.S. PATENT DOCUMENTS

| 7,725,827 | B2 * | 5/2010 | Poslinski | 715/721 |
| 2002/0174430 | A1 * | 11/2002 | Ellis et al. | 725/46 |
| 2004/0154040 | A1 * | 8/2004 | Ellis | 725/58 |
| 2006/0080711 | A1 * | 4/2006 | Kim | 725/58 |

FOREIGN PATENT DOCUMENTS

| JP | 2005-175519 | 6/2005 |
| JP | 2005-223801 | 8/2005 |

* cited by examiner

*Primary Examiner* — Hunter B. Lonsberry
*Assistant Examiner* — Sumaiya A Chowdhury
(74) *Attorney, Agent, or Firm* — Cowan, Liebowitz & Latman, P.C.

(57) ABSTRACT

A recording control apparatus for controlling execution of recording in a recording apparatus, comprising, a channel selection acceptance unit configured to accept a channel selection from a user, a display controller to control a display unit to display program data which is selected among received program data via broadcast signal and is corresponding to the accepted channel selection, an obtaining unit configured to obtain reserve-recording information to be executed, and a determination unit configured to determine whether or not the program displayed on the display unit corresponds to a program according to the reserve-recording information, wherein when the determination unit determines that the program displayed on the display unit corresponds to a program according to the reserve-recording information, the display controller controls the display unit to display a query screen to inquire of the user whether to erase recorded data corresponding to the reserve-recording information in the recording apparatus.

10 Claims, 12 Drawing Sheets

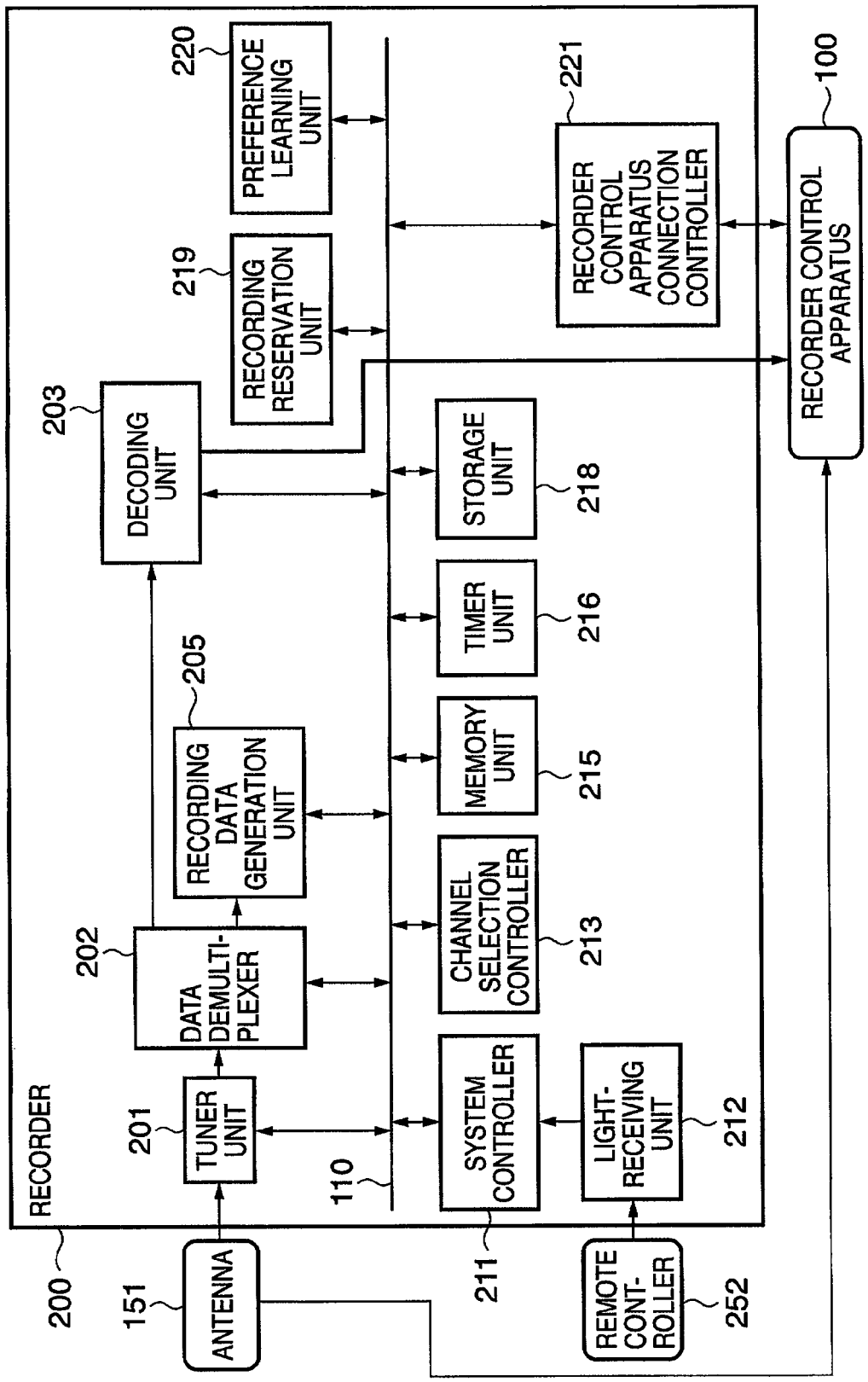

FIG. 3A

| index | CHANNEL 302 | PROGRAM TITLE 303 | RECORDING RESERVATION TYPE 304 | SCHEDULED RECORDING DATE 305 | SCHEDULED RECORDING START TIME 306 | SCHEDULED RECORDING END TIME 307 |
|---|---|---|---|---|---|---|
| 1 | 151 | ABC | AUTO | 2006/11/1 | 20:00 | 20:55 |
| 2 | 181 | DEF | MANUAL | 2006/11/1 | 21:00 | 22:55 |
| 3 | 161 | LMN | AUTO | 2006/11/2 | 21:00 | 22:55 |
| ⋮ | ⋮ | ⋮ | ⋮ | ⋮ | ⋮ | ⋮ |
| N-1 | 103 | 12A | AUTO | 2006/11/4 | 19:00 | 19:55 |
| N | 141 | AC5 | AUTO | 2006/11/4 | 20:00 | 21:00 |

FIG. 3B

| index | CHANNEL 302 | PROGRAM TITLE 303 | RECORDING RESERVATION TYPE 304 | PREFERENCE 311 | SCHEDULED RECORDING DATE 305 | SCHEDULED RECORDING START TIME 306 | SCHEDULED RECORDING END TIME 307 |
|---|---|---|---|---|---|---|---|
| 1 | 151 | ABC | AUTO | 4 | 2006/11/1 | 20:00 | 20:55 |
| 2 | 181 | DEF | MANUAL | - | 2006/11/1 | 21:00 | 22:55 |
| 3 | 161 | LMN | AUTO | 5 | 2006/11/2 | 21:00 | 22:55 |
| ⋮ | ⋮ | ⋮ | ⋮ | ⋮ | ⋮ | ⋮ | ⋮ |
| N-1 | 103 | 12A | AUTO | 3 | 2006/11/4 | 19:00 | 19:55 |
| N | 141 | AC5 | AUTO | 1 | 2006/11/4 | 20:00 | 21:00 |

FIG. 3C

| PREFERENCE INFORMATION 321 | 1 | 2 | 3 | 4 | 5 |
|---|---|---|---|---|---|
| DISPLAY TIME (SEC) 322 | 16 | 14 | 12 | 10 | 8 |

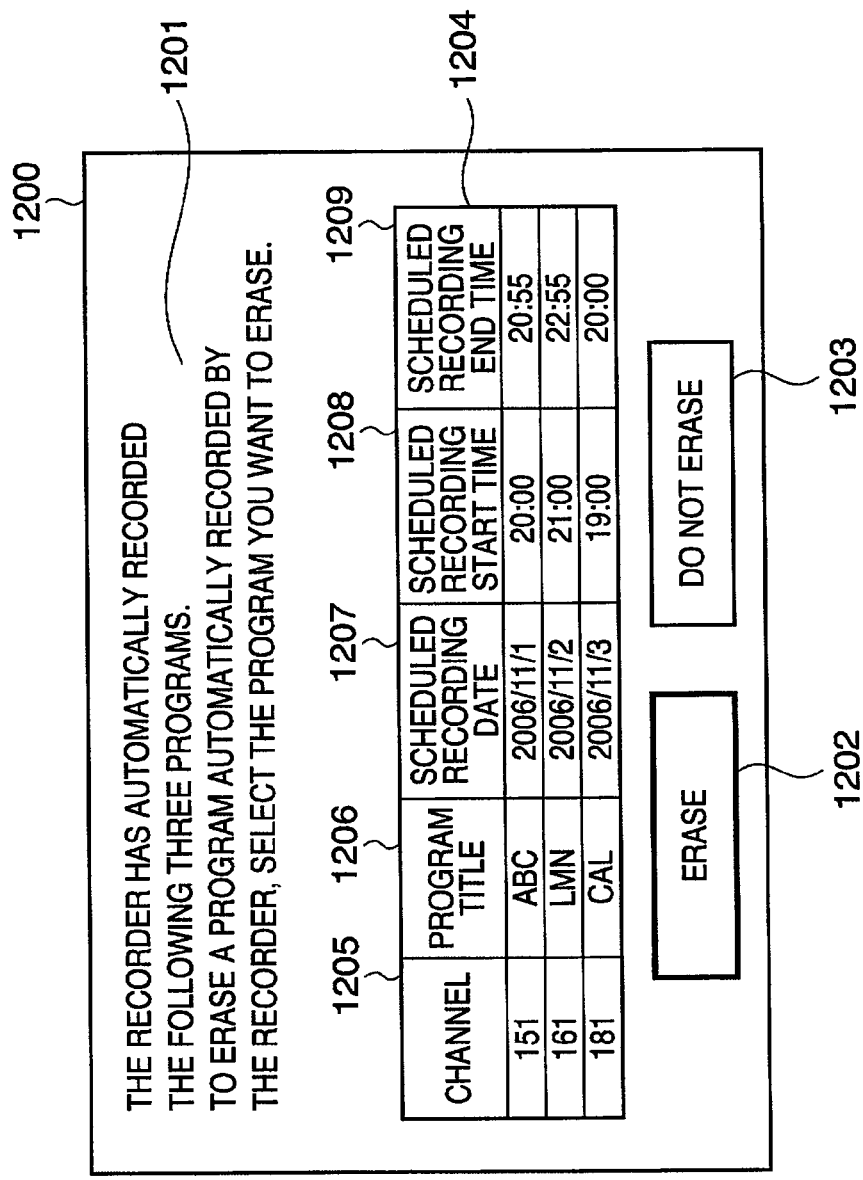

RECORDING CONTROL APPARATUS AND CONTROL METHOD THEREOF

BACKGROUND OF THE INVENTION

1. Field of the Invention

The present invention relates to a recording control apparatus and a control method thereof.

2. Description of the Related Art

BS/CS digital broadcasting and terrestrial digital broadcasting broadcast an EPG (Electronic Program Guide) together with TV programs. A user of a recorder which supports such digital broadcasting can easily select a program to be recorded by reserve-recording using the EPG.

Some recorders learn user's preference, i.e., programs a user is inclined to view, based on the user's recording reservation and recorded program viewing logs. These recorders automatically make program recording reservations based on a user preference determination result.

On the other hand, the user sometimes does not want the recorder to execute recording a program if he/she is going to view that same program in real time. This is because the user sometimes finds it cumbersome to operate the recorder and delete the program after recording. Inventions have been proposed, which inhibit program recording when a user is viewing a program reserved for recording (Japanese Patent Laid-Open Nos. 2005-175519 and 2005-223801).

Of the above inventions, the recorder described in Japanese Patent Laid-Open No. 2005-175519 inquires a user to cancel the recording for both a program the user has actively reserved for recording and a program the recorder has automatically reserved for recording based on the user's preference and the like. Hence, the recorder frequently issues notifications to the user which make him/her feel inconvenient. Additionally, many users do not require a query/notification of recording cancel for a program he/she has actively reserved for recording.

The reorder described in Japanese Patent Laid-Open No. 2005-223801 controls to automatically inhibit recording when a user is going to view a program which the recorder has automatically reserved for recording based on the user preference and the like. On the other hand, the recorder permits recording and viewing simultaneously by setting the user absent state. However, how to handle a program which the user has actively reserved for recording is not taken into consideration.

SUMMARY OF THE INVENTION

The present invention has as its object to allow accepting a recording cancel request by notifying a user that he/she is going to view the same program as that to be recorded "automatically" by a recorder or that he/she is viewing the same program as that is being recorded "automatically".

According to one aspect of the embodiments, the present invention relates to a recording control apparatus for controlling execution of recording in a recording apparatus, comprising a channel selection acceptance unit configured to accept a channel selection from a user, a display controller configured to control a display unit to display program data which is selected among received program data via broadcast signal and is corresponding to the channel selection accepted by the channel selection acceptance unit, an obtaining unit configured to obtain reserve-recording information to be executed by the recording apparatus, and a determination unit configured to determine whether or not the program displayed on the display unit corresponds to a program according to the reserve-recording information, wherein when the determination unit determines that the program displayed on the display unit corresponds to a program according to the reserve-recording information, the display controller controls the display unit to display a query screen to inquire of the user whether to erase recorded data corresponding to the reserve-recording information in the recording apparatus.

According to one aspect of the embodiments, the present invention relates to a recording control apparatus for controlling execution of recording in a recording apparatus, comprising, an indication acceptance unit configured to accept, from a user, an indication to terminate recording that is being executed in the recording apparatus, and an erasing unit configured to erase data recorded according to the accepted indication by the indication acceptance unit.

Further features of the present invention will become apparent from the following description of exemplary embodiments (with reference to the attached drawings).

BRIEF DESCRIPTION OF THE DRAWINGS

FIG. 2 is a block diagram showing an example of the arrangement of a recorder 200 controllable by the recording control apparatus 100 and the connection arrangement with an external device according to the first embodiment of the present invention;

FIG. 3A is a view showing an example of a recording reservation information table according to the first embodiment of the present invention;

FIG. 3B is a view showing an example of the recording reservation information table according to the first modification of the first embodiment of the present invention;

FIG. 3C is a view showing an example of an association table between preference information and an "automatic recording continuation selection notification" screen display time according to the first modification of the first embodiment of the present invention;

FIG. 12 is a view showing an example of an "automatically recorded program erase selection notification" screen according to the second modification of the second embodiment of the present invention.

DESCRIPTION OF THE EMBODIMENTS

The embodiments of the present invention will now be described.

First Embodiment

The first embodiment of the present invention will be described below with reference to the accompanying drawings.

Figure 1:
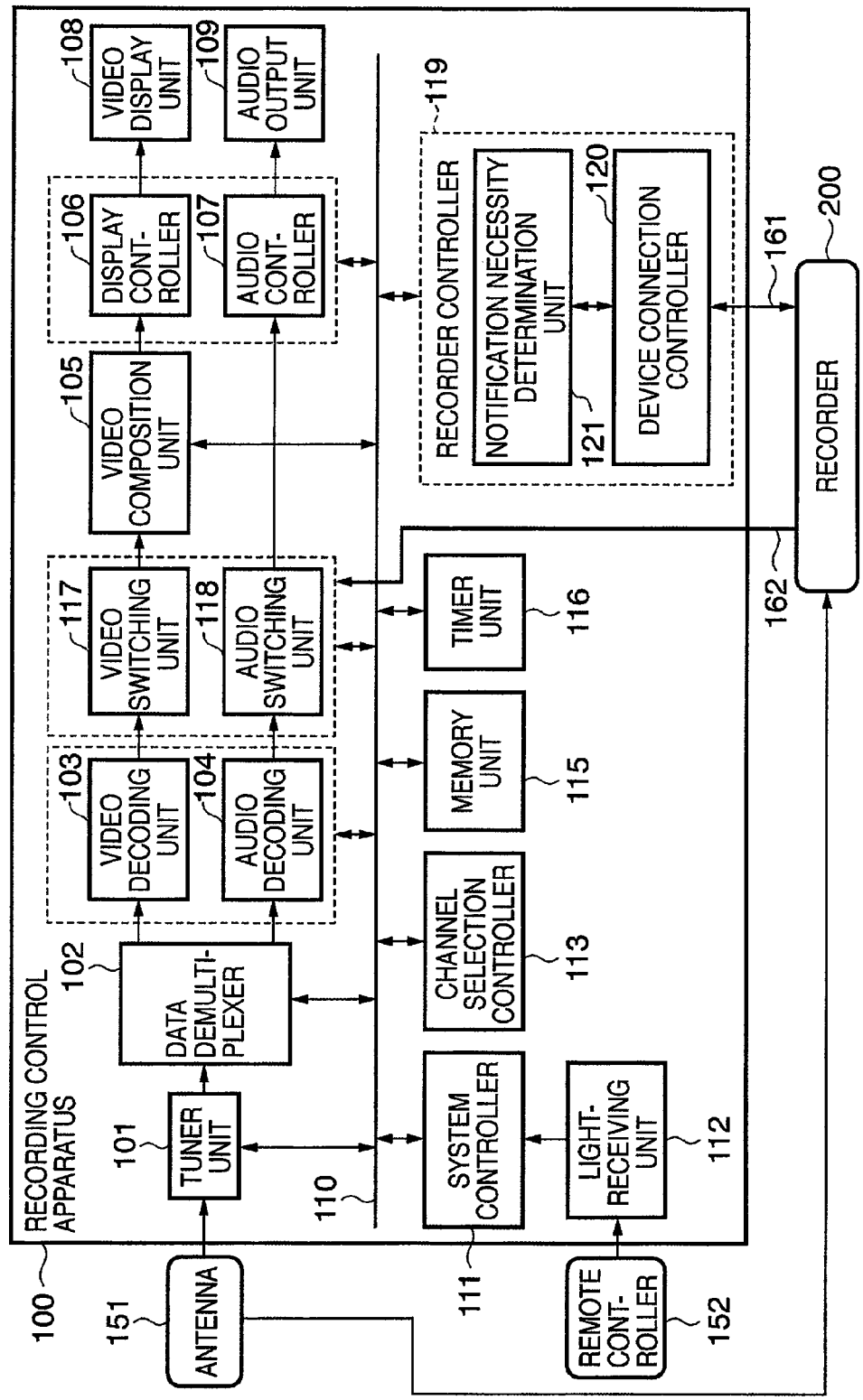
FIG. 1 is a block diagram showing an example of the arrangement of a recording control apparatus 100 and the connection arrangement with an external device according to the first embodiment of the present invention.

FIG. 1 is a block diagram showing an example of the arrangement of a recording control apparatus 100 and the connection arrangement with an external device according to the first embodiment of the present invention. FIG. 2 is a block diagram showing an example of the arrangement of a recorder 200 controllable by the recording control apparatus 100 and the connection arrangement with an external device according to this embodiment.

The recording control apparatus 100 has a TV broadcasting channel selection process function as a TV basic function. The recording control apparatus 100 includes a tuner unit 101, data demultiplexer 102, video decoding unit 103, audio decoding unit 104, video composition unit 105, display controller 106, audio controller 107, video display unit 108, audio output unit 109, and system bus 110. The recording control apparatus 100 also includes a system controller 111, light-receiving unit 112, channel selection controller 113, memory unit 115, timer unit 116, video switching unit 117, audio switching unit 118, and recorder controller 119 (including a device connection controller 120 and a notification necessity determination unit 121). The roles of the above constituent elements will be described later in association with the function of the recording control apparatus 100.

The recording control apparatus 100 also has a function of receiving video and audio data from an external recorder represented by the recorder 200 and displaying video and outputting audio. As a function of controlling the recorder 200, the recording control apparatus 100 has a recording control process (e.g., recording reservation information obtaining, recording reservation cancel, recording cancel, and recorded data erase request) function. The recorder 200 includes a tuner unit 201, data demultiplexer 202, decoding unit 203, recording data generation unit 205, system controller 211, light-receiving unit 212, channel selection controller 213, memory unit 215, and timer unit 216. The recorder 200 also includes a storage unit 218, recording reservation unit 219, preference learning unit 220, and recording control apparatus connection controller 221. The roles of the above constituent elements will be described later in association with the function of the recorder 200.

In this embodiment, the recording control apparatus 100 and the recorder 200 are preferably connected by a UPnP (Universal Plug & Play) network via an Ethernet® 161. The UPnP is a technical standard for connecting devices such as a TV set and a recorder and allowing them to lend functions to each other. A description of the technical standard of the UPnP will be omitted. The recording control process of this embodiment expands and implements actions, events, and state variables to be transmitted and received based on the UPnP technical standard.

[Recording Control Apparatus 100]

The function of the recording control apparatus 100 will be described first with reference to FIG. 1. The recording control apparatus 100 can execute a channel selection process function. The channel selection process function causes the tuner unit 101 to receive a broadcast signal via an antenna 151 and outputs program data associated with a channel corresponding to channel selection acceptance based on a user operation of a remote controller 152. More specifically, this function displays video or program information on the video display unit 108 as program data associated with a channel corresponding to channel selection acceptance and outputs audio from the audio output unit 109.

An internal operation of the recording control apparatus 100 for the channel selection process will be described below. The system controller 111 determines a channel desired by a user based on operation information corresponding to a user remote controller operation received via the light-receiving unit 112 and sends a channel selection request to the channel selection controller 113. The channel selection controller 113 starts channel selection control of the tuner unit 101 and data demultiplexer 102 based on the channel selection request.

The tuner unit 101 executes processes such as demodulation and error correction for a received broadcast signal, forms a transport stream (TS), and outputs it to the data demultiplexer 102. The TS contains multiplexed program data of a plurality of channels, including video, audio, program information, and current time information. The program information contains a program title, program content explanation, channel, broadcast time information (broadcast date, start time, and duration), and program genre information. The current time information contains year/month/day and hr/min/sec information.

The data demultiplexer 102 demultiplexes video, audio, program information, and current time information associated with the desired channel from the TS. The video data demultiplexed by the data demultiplexer 102 is output to the video decoding unit 103 which executes a video decoding process such as MPEG. Audio data is output to the audio decoding unit 104 which executes a decoding process such as MPEG and outputs the audio data to the audio controller 107 via the audio switching unit 118. The program information is stored in the memory unit 115. The current time information is output to the timer unit 116 via the system bus 110. The timer unit 116 counts the time information.

The video data decoded by the video decoding unit 103 is output to the display controller 106 via the video switching unit 117 and video composition unit 105. The display controller 106 converts the video data into display data and timing suitable for the display resolution, number of display colors, and refresh rate of the video display unit 108 and displays video.

The video display unit 108 can use any display device such as a CRT, LCD, PDP, or SED. The video display unit 108 may or may not be included in the recording control apparatus 100. When the recording control apparatus 100 does not include the video display unit 108, the externally arranged video display unit 108 and the recording control apparatus 100 are connected via a video signal line.

The audio output unit 109 is a so-called speaker which may or may not be included in the recording control apparatus 100 or not. When the recording control apparatus 100 does not include the audio output unit 109, the externally arranged audio output unit 109 and the recording control apparatus 100 are connected via an audio signal line. When the audio output unit 109 is externally arranged, it may be integrated with the externally arranged video display unit 108 to form a video/audio output unit.

The video composition unit 105 has a function of compositing video data decoded by the video decoding unit 103 with graphic data generated by the system controller 111. The audio controller 107 has a function of changing, e.g., the volume level of audio data. When the above-described channel selection process operation is normally completed, the channel selection controller 113 stores the selected channel information in the memory unit 115.

The video switching unit 117 has a function of selectively outputting, to the video composition unit 105, video data from the video decoding unit 103 or video data input from the recorder 200 via an AV line 162 based on a request from the system controller 111.

The audio switching unit 118 has a function of selectively outputting, to the audio controller 107, audio data from the audio decoding unit 104 or audio data input from the recorder 200 via the AV line 162 based on a request from the system controller 111.

[Recorder 200]

The function of the recorder 200 will be described next with reference to FIG. 2. The recorder 200 can execute a playback process function and a playback process function.

[Recording Process Function]

The recording process function of the recorder 200 will be described. The recording process function causes the tuner unit 201 to receive a broadcast signal via the antenna 151 and records/stores, in the storage unit 218, video, audio, and program information associated with a desired channel.

The recording process is executed in accordance with two timings. One timing is that the user requests to record a program on the air by operating a remote controller 252. The other timing is based on recording reservation. Recording reservation indicates setting in advance execution of recording of a program which is scheduled to go on the air at a certain time. When the user makes a recording reservation, the recorder 200 starts recording at the set time. A recording reservation is made by a user's manual operation (user operation) of designating a time and a program, or automatically by the recorder 200 which designates a time and a program. In this embodiment, "reserve-recording" indicates a recording process which is actually executed at a set time based on the above recording reservation.

The recorder 200 automatically makes a recording reservation by, e.g., deciding a recording target program based on a user preference determination result which is learned by the preference learning unit 220 using a manual recording reservation log, recorded program viewing log, and the like. In this embodiment, this recording method will be referred to as "automatic recording reservation".

Recording reservation by a user operation is done by, e.g., designating a recording target program from the EPG, designating and inputting a channel and a broadcast date and time, designating a recording target program which is found by a search using keyword input, or inputting a G code. In this embodiment, these methods will be referred to as "manual recording reservation (second recording reservation)" as a whole.

The execution timing of automatic recording reservation can be set, e.g., after execution of manual recording reservation, after program information storage in the memory unit 115, or at a periodical timing (e.g., once every 5 min). Note that when the program content explanation of program information includes a keyword input by the user, the recorder 200 can handle the program as an automatic recording reservation program.

When the above-described manual recording reservation or automatic recording reservation is executed, the recording reservation unit 219 stores "recording reservation information" about the recording target program in the memory unit 215. The recording reservation information contains not only a channel, program title, scheduled recording date, scheduled recording start time, scheduled recording end time obtained from the program information stored in the memory unit 215 but also recording reservation type information. The recording reservation type information is generated as information which allows to identify manual recording reservation or automatic recording reservation.

FIG. 3A shows an example of recording reservation information registered and stored by the recording reservation unit 219. Referring to FIG. 3A, a recording reservation information table 300 includes an index 301, channel 302, program title 303, recording reservation type 304, scheduled recording date 305, scheduled recording start time 306, and scheduled recording end time 307. The pieces of information of the scheduled recording date 305, scheduled recording start time 306, and scheduled recording end time 307 constitute the "scheduled broadcast date and time" of the recording reservation target program.

An identification number for identifying each recording reservation information of a table entry is registered in the index 301. The channel of each recording reservation program is registered in the channel 302. If a plurality of broadcast types (e.g., terrestrial digital broadcasting, terrestrial analog broadcasting, satellite broadcasting, cable TV, and the like) are present, the broadcast type may also be registered.

The program title of each recording reservation program is registered in the program title 303. The type of each recording reservation is registered in the recording reservation type 304. "Auto" indicates that corresponding recording reservation information is automatic recording reservation information. "Manual" indicates that corresponding recording reservation information is manual recording reservation information (second recording reservation information). The registered contents are not limited to those described above if they can discriminate between automatic recording reservation information and manual recording reservation information. For example, automatic recording reservation: 1, and manual recording reservation: 0 may be registered.

The year/month/day in which each program to be recorded is scheduled to go on the air is registered in the scheduled recording date 305. The broadcast start time of each program to be recorded is registered in the scheduled recording start time 306. The broadcast end time of each program to be recorded is registered in the scheduled recording end time 307. The broadcast end time can be specified based on the start time and duration of program information.

In FIG. 3A, N programs are registered as recording reservation programs. N is an "arbitrary number" and can be set as needed in accordance with the embodiment. Referring to FIG. 3A, for example, an "automatic recording reservation" has been made for a program titled "ABC" on channel "151" from 20:00 to 20:55 on "2006/11/1". In addition, a "manual recording reservation" has been made for a program titled "DEF" on channel "181" from 21:00 to 22:55 on "2006/11/1".

An internal operation of the recorder 200 for a recording process based on recording reservation information will be described below.

The recording reservation unit 219 periodically obtains recording reservation information stored in the memory unit 215 and determines whether the start time of a recording reservation program registered in the recording reservation information has come. If the start time has come, the recording reservation unit 219 sends, to the system controller 211, a recording start request together with the channel information registered in the recording reservation information. The system controller 211 sends a channel selection request and the channel information to the channel selection controller 213.

The operation related to channel selection of the channel selection controller 213, tuner unit 201, and data demultiplexer 202 is the same as that of the channel selection controller 113, tuner unit 101, and data demultiplexer 102 in FIG. 1, and a description thereof will not be repeated. The data demultiplexer 202 outputs the demultiplexed video, audio, and program information to the recording data generation unit 205.

The program information is also stored in the memory unit 215. The current time information is output to the timer unit 216. The timer unit 216 counts the time information.

When channel selection control is completed, the system controller 211 requests the recording data generation unit 205 to generate stream data to be stored in the storage unit 218. The stream data generated by the recording data generation unit 205 is stored in the storage unit 218 based on a request from the system controller 211, and recording starts. This recording operation continues until the scheduled recording end time registered in the recording reservation information.

When recording is complete, the recording reservation unit 219 registers the channel, program title, program content explanation, program genre, recording reservation type, recording date, recording start time, and recording end time of the recorded program as "recording log information", and stores it in the memory unit 215.

[Playback Process Function]

The playback process function of the recorder 200 will be described next. The playback process function causes the recorder 200 to play back a recorded program and the recording control apparatus 100 to display video and output audio.

Upon accepting a playback start indicate based on the user operation on the remote controller 252, the decoding unit 203 obtains stream data stored in the storage unit 218, starts decoding video and audio data, and outputs the data to the recording control apparatus 100.

After the start of playback, the system controller 211 registers the channel, program title, program content explanation, program genre, recording reservation type, recording date, recording start time, recording end time, and playback count of the program that is being played back as "playback log information", and stores it in the memory unit 215.

The preference learning unit 220 has a function of determining the user preference based on the "recording log information" and "playback log information" stored in the memory unit 215. With this function, the preference learning unit 220 can manage preference information.

[Notification Operation for User]

A notification operation for the user according to the embodiment of the present invention will be described next.

Figure 4:
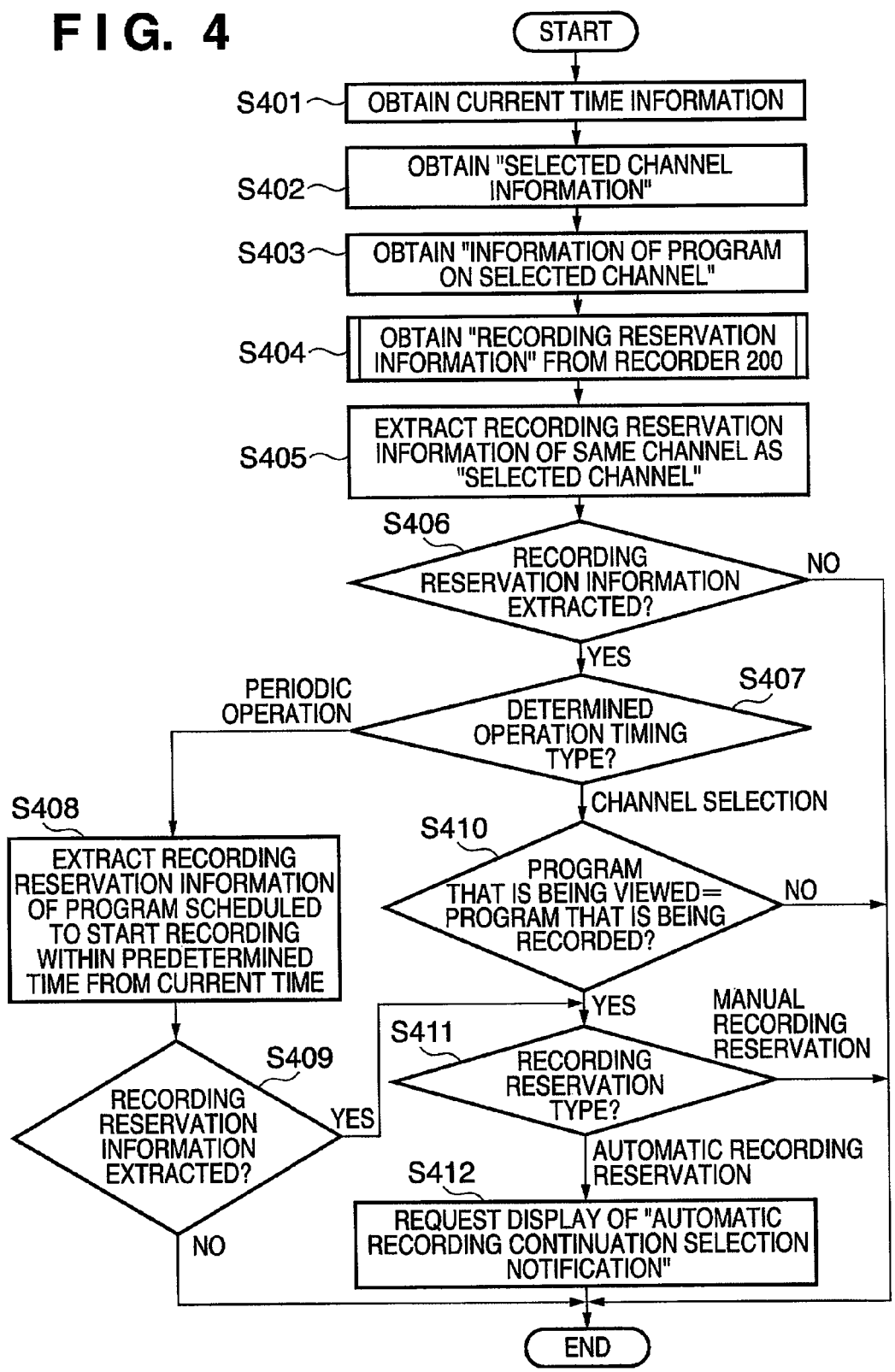
FIG. 4 is a flowchart illustrating an example of processing in a device connection controller 120 and a notification necessity determination unit 121 in a recorder controller 119 according to the first embodiment of the present invention.

FIG. 4 illustrates an example of the operation sequence of the device connection controller 120 and notification necessity determination unit 121 in the recorder controller 119, which starts based on a request from the system controller 111. The respective constituent elements execute a corresponding process program, thereby implementing a process corresponding to the sequence. This operation enables to notify the user that he/she is going to view or is viewing a program which is the same as a program reserved for recording or being recorded by the "automatic recording reservation" of the recorder 200.

In this embodiment, the operation shown in FIG. 4 starts periodically, e.g., once every 3 min and at the channel selection completion timing. The system controller 111 stores, in the memory unit 115, operation trigger information to identify whether the operation shown in FIG. 4 has started periodically or at the channel selection completion timing.

The operation of notifying the user that he/she is going to view or is viewing a program which is the same as a program reserved for recording or being recorded by the "automatic recording reservation" of the recorder 200 will be referred to as "automatic recording continuation selection notification" hereinafter.

The process of each step of the operation sequence shown in FIG. 4 will be described below.

In step S401, the notification necessity determination unit 121 obtains current time information from the timer unit 116. In step S402, the notification necessity determination unit 121 obtains the information of a current selected channel (selected channel information) from the memory unit 115. At this time, the video display unit 108 is displaying the program on the current selected channel. In step S403, the notification necessity determination unit 121 obtains the program information of the program that is being broadcast on the current selected channel (selected channel program information) from the memory unit 115.

In step S404, the notification necessity determination unit 121 obtains, from the recorder 200 via the device connection controller 120, recording reservation information registered in the memory unit 215 as the recording reservation information table 300 exemplified in FIG. 3A. Obtaining the recording reservation information makes it possible to identify the channel, program title, recording reservation type, scheduled recording date, scheduled recording start time, and scheduled recording end time of each program reserved for recording in the recorder 200.

In step S405, the notification necessity determination unit 121 extracts recording reservation information corresponding to, of the programs reserved for recording in the recorder 200, a recording reservation program on the same channel as the current selected channel in the recording control apparatus 100. This process can be performed based on the selected channel information obtained in step S402 and channel information (corresponding to the registered contents of the channel 302) in the recording reservation information obtained in step S404.

In step S406, the notification necessity determination unit 121 determines the presence/absence of recording reservation information extracted in step S405. If extracted recording reservation information exists ("YES" in step S406), the process advance to step S407. If no extracted recording reservation information exists ("NO" in step S406), the process is directly ended.

In step S407, the process branches based on an operation timing type determination result obtained by determining based on the operation trigger information stored in the memory unit 115 by the system controller 111 whether the operation in FIG. 4 has started periodically or at the channel selection completion timing. If the operation has started at the periodic timing ("periodic operation" in step S407), the process advance to step S408. If the operation has started at the channel selection completion timing ("channel selection" in step S407), the process advances to step S410.

An operation executed when the sequence has started at the periodic operation timing will be described. Whether a correspondence relationship holds between the selected channel and the recording reservation information is determined based on whether broadcast of the reserve-recording target program should start on the selected channel within a predetermined time from the current time. For the correspondence relationship, the selected channel may be replaced with the program displayed on the video display unit 108.

More specifically, in step S408, the notification necessity determination unit 121 extracts, from the recording reservation information extracted in step S405, recording reservation information corresponding to a program scheduled to start recording within a predetermined time from the current time. This extraction can be done based on the current time information obtained in step S401 and the scheduled broadcast date and time information contained in the recording reservation information obtained in step S405. The scheduled broadcast date and time information contains the "scheduled recording date" and "scheduled recording start time". In this embodiment, "8 min" is set as the predetermined time to extract only a program scheduled to start recording within 8 min.

In step S409, the notification necessity determination unit 121 determines the presence/absence of recording reservation information extracted in step S408. If extracted recording reservation information exists ("YES" in step S409), the process advance to step S411. If no extracted recording reservation information exists ("NO" in step S409), the process is directly ended.

An operation executed when the sequence has started at the channel selection completion timing will be described next. Whether a correspondence relationship holds between the selected channel and the recording reservation information is determined based on whether the program which is being broadcast on the selected channel is a reserve-recording execution target. For the correspondence relationship, the selected channel may be replaced with the program displayed on the video display unit 108.

More specifically, in step S410, the notification necessity determination unit 121 determines whether the program the user is viewing now matches the program the recorder 200 is recording currently. This determination is done based on the current time information obtained in step S401 and the scheduled broadcast date and time information contained in the recording reservation information obtained in step S405. The scheduled broadcast date and time information contains the "scheduled recording date", "scheduled recording start time", and "scheduled recording end time". If the programs match ("YES" in step S410), the process advance to step S411. If the programs do not match ("NO" in step S410), the process is directly ended.

In step S411, the notification necessity determination unit 121 determines the contents of recording reservation type contained in the recording reservation information extracted in step S409 or the recording reservation information determined to match in step S410. This determination allows the notification necessity determination unit 121 to determine the necessity of display of an "automatic recording continuation selection notification". If the recording reservation type is "auto" ("automatic recording reservation" in step S411), the process advance to step S412. If the recording reservation type is "manual" ("manual recording reservation" in step S411), the process is directly ended.

In step S412, the notification necessity determination unit 121 requests the system controller 111 to display the "automatic recording continuation selection notification". The display form of the "automatic recording continuation selection notification" requested here can correspond to the operation timing type determination result in step S407. In requesting display, the notification necessity determination unit 121 notifies the system controller 111 of the "program title" information extracted from the recording reservation information together.

The system controller 111 generates screen graphic data for the "automatic recording continuation selection notification" based on the request from the notification necessity determination unit 121 and displays it on the video display unit 108 via the video composition unit 105 and display controller 106 (second display control step).

A detailed example of display of the "automatic recording continuation selection notification" and a user response to the display will be described below with reference to FIGS. 5A and 6A. In the example shown in FIGS. 5A and 6A, recording reservation information whose index 301 is "1" in the recording reservation information table 300 in FIG. 3A is obtained from the recorder 200.

Figure 5A:
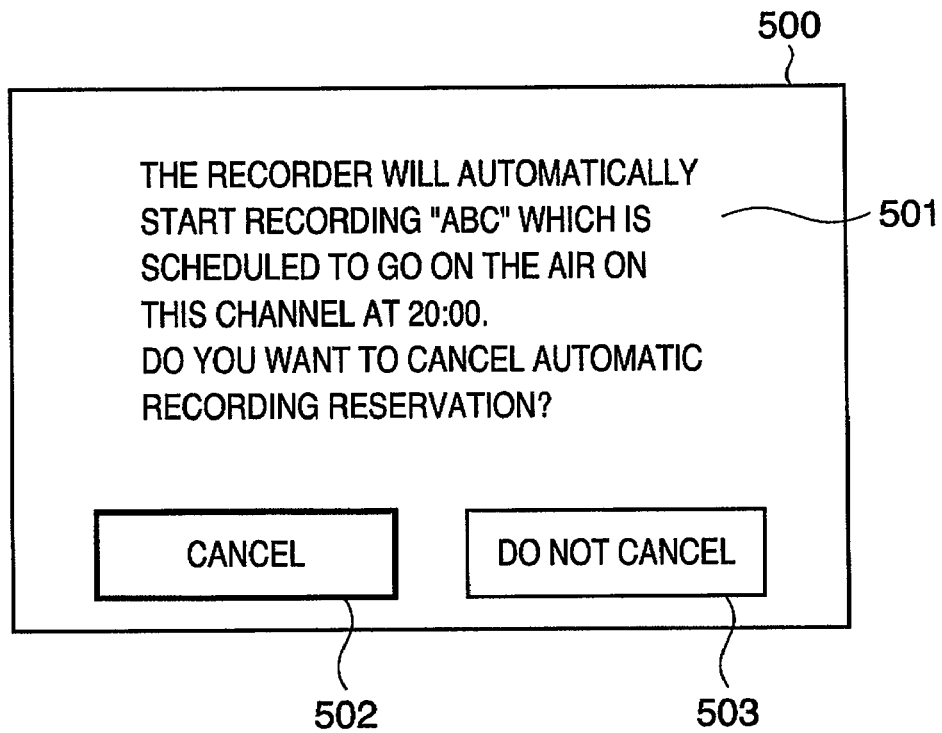
FIG. 5A is a view showing an example of an automatic recording continuation selection notification screen displayed on a video display unit 108 when "periodic operation" is determined in step S407 in FIG. 4 according to the first embodiment.

FIG. 5A is a view showing an example of an automatic recording continuation selection notification screen displayed on the video display unit 108 when "periodic operation" is determined in step S407 in FIG. 4. FIG. 5A shows a display example assuming that the current time is "2006/11/1 19:53", and the user is viewing a program on channel "151" in the recording control apparatus 100.

On an automatic recording continuation selection notification screen 500, an automatic recording continuation selection notification message is displayed in an area 501. In this case, the recording control apparatus 100 determines that an "automatic recording reservation" has been made for program "ABC" which is scheduled to be broadcast on channel "151 from "2006/11/1 20:00", and displays a corresponding message in the area 501. Selection buttons 502 and 503 are displayed on the lower side of the area 501. The button display inquires of the user whether to "cancel (502)" the automatic recording reservation of program "ABC" or "do not cancel (503)", and prompts him/her to select one of them.

On the basis of operation information corresponding to the user operation on the remote controller 152 and received via the light-receiving unit 112, the system controller 111 determines which of "cancel (502)" and "do not cancel (503)" is selected by the user. Upon determining that the user has selected "do not cancel (503)", the system controller 111 requests the video composition unit 105 to erase the automatic recording continuation selection notification screen 500, and finishes the process.

On the other hand, upon determining that the user has selected "cancel (502)", the system controller 111 requests the video composition unit 105 to erase the automatic recording continuation selection notification screen 500. The system controller 111 simultaneously requests the recorder controller 119 to cancel the automatic recording reservation of program "ABC". The device connection controller 120 (second indicate unit) in the recorder controller 119 sends, to the recorder 200, a request for canceling the automatic recording reservation of program ABC, and finishes the process.

Figure 6A:
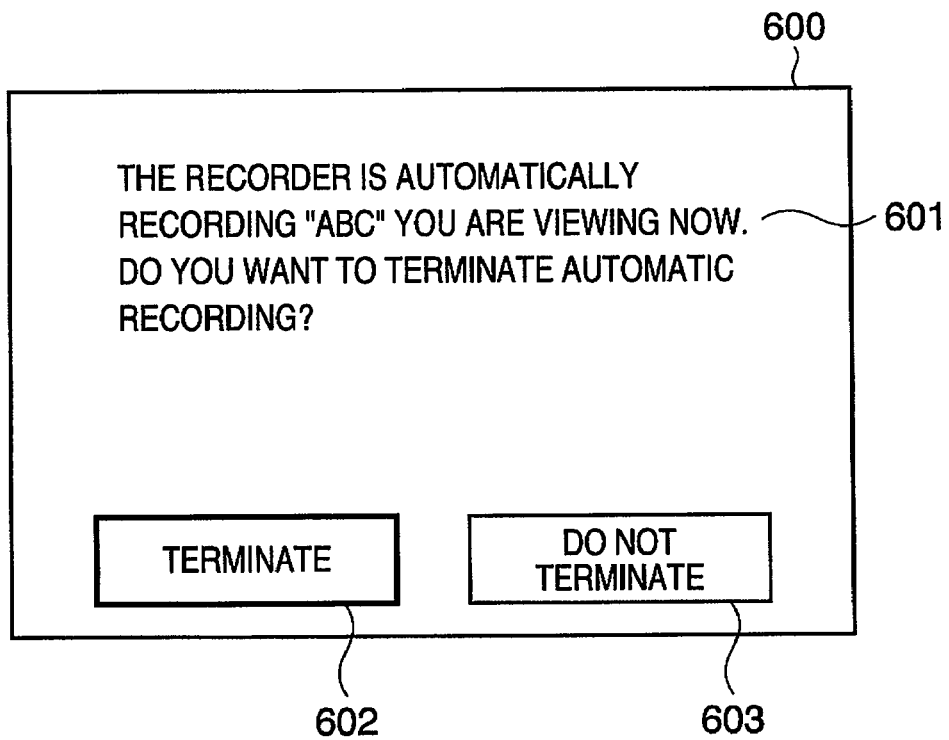
FIG. 6A is a view showing an example of an automatic recording continuation selection notification screen displayed on the video display unit 108 when "channel selection" is determined in step S407 in FIG. 4 according to the first embodiment.

FIG. 6A is a view showing an example of an automatic recording continuation selection notification screen displayed on the video display unit 108 when "channel selection" is determined in step S407 in FIG. 4. FIG. 6A shows a display example assuming that the current time is "2006/11/1 20:05", and the user has selected a program on channel "151" in the recording control apparatus 100 and started viewing it.

On an automatic recording continuation selection notification screen 600, an automatic recording continuation selection notification message is displayed in an area 601. In this case, the recording control apparatus 100 determines that program "ABC" which is scheduled to be broadcast on channel "151 from "2006/11/1 20:00" is being recorded by "automatic recording reservation", and displays a corresponding message in the area 601. Selection buttons 602 and 603 are displayed on the lower side of the area 601. The button display inquires of the user whether to "terminate (602)" recording of program "ABC" or "do not terminate (603)", and prompts him/her to select one of them.

On the basis of operation information corresponding to the user operation on the remote controller 152 and received via the light-receiving unit 112, the system controller 111 determines which "terminate (602)" and "do not terminate (603)" is selected by the user. Upon determining that the user has selected "do not terminate (603)", the system controller 111 requests the video composition unit 105 to erase the automatic recording continuation selection notification screen 600, and finishes the process.

On the other hand, upon determining that the user has selected "terminate (602)", the system controller 111 requests the video composition unit 105 to erase the automatic recording continuation selection notification screen 600. The system controller 111 simultaneously requests the recorder controller 119 to terminate execution of recording of program "ABC" and erase the recorded data. The device connection controller 120 in the recorder controller 119 sends, to the recorder 200, a request for terminating execution of the recording operation of program ABC and erasing the recorded data, and finishes the process. In this way, the device connection controller 120 in the recorder controller 119 sends one of the recording reservation cancel request, recording cancel request, and recorded data erase request to the recorder 200 based on the user response by "automatic recording continuation selection notification".

The recorder 200 causes the recording control apparatus connection controller 221 to receive one of the recording reservation cancel request, recording cancel request, and recorded data erase request, and executes a recording reservation cancel process, recording cancel process, or recorded data erase process.

If no user selection response is received within a predetermined time after the display of the automatic recording continuation selection notification screen shown in FIG. 5A or 6A, the screen may be erased in accordance with a request sent from the system controller 111 to the video composition unit 105. For example, the automatic recording continuation selection notification screen can be erased when no user selection response is received within 10 sec. The system controller 111 need not issue the recording reservation cancel request or recording cancel request if no user selection response is received within 10 sec.

According to this embodiment, the user can receive a notification by screen display only when he/she is going to view the same program as that to be recorded "automatically" by the recorder or he/she is viewing the same program as that is being recorded "automatically" by the recorder. Hence, the user can cause the recorder to cancel recording reservation, terminate automatic recording, or erase an automatically recorded program by a simple operation based on the notification.

This releases the user from the cumbersomeness of being inquired each time whether to execute or continue recording of a recording reservation made by himself/herself.

First Modification of First Embodiment

In the above-described first embodiment, the time from the display of the automatic recording continuation selection notification screen 500 or 600 to the erase without reception of a user operation is set to a uniform predetermined time (10 sec in the above example).

However, it is also possible to set the predetermined time not as a uniform time but stepwise based on user preference information for automatic recording reservations determined by the recorder 200 or automatically recorded programs, as in this modification.

The preference information can be added as an item to the recording reservation information table shown in FIG. 3A. FIG. 3B shows an example of the recording reservation information table with the preference information added.

Referring to FIG. 3B, the index 301, channel 302, program title 303, recording reservation type 304, scheduled recording date 305, scheduled recording start time 306, and scheduled recording end time 307 are the same as in the recording reservation information table 300 shown in FIG. 3A. Newly added preference information 311 indicates the preference of each reserved program on a scale of 1 to 5. In this case, "5" indicates the highest preference, and "1" indicates the lowest preference.

When a recording reservation information table 310 shown in FIG. 3B is used, an additional process step can be inserted between step S411 and step S412 of the flowchart in FIG. 4. In the additional step, the notification necessity determination unit 121 determines the contents of preference information contained in the recording reservation information extracted in step S409 or the recording reservation information determined to match in step S410. The display time of the "automatic recording continuation selection notification" screen is decided based on the determination result.

The display time can be decided based on an association table between preference information and the "automatic recording continuation selection notification" screen display time as shown in FIG. 3C. An association table 320 in FIG. 3C registers preference information 321 and display time (sec) 322 in association with each other. According to the association table 320, for example, the notification necessity determination unit 121 can decide the display time as "8 sec" for preference information "5", and as "16 sec" for preference information "1".

In step S412 next to the additional step, the notification necessity determination unit 121 requests the system controller 111 to display the "automatic recording continuation selection notification" for the display time decided in the additional step. The display form and other contents at this time are the same as described above.

It is also possible to prolong the user determination time to perform, for a program determined to have a low user preference, the operation of canceling an automatic recording reservation, terminating automatic recording, or erasing an automatically recorded program.

Second Modification of First Embodiment

In the above-described first embodiment, the user requests cancel of automatic recording reservation or automatic recording based on the display of the automatic recording continuation selection notification screen 500 in FIG. 5A. However, when the automatic recording continuation selection notification screen 500 is displayed, the user may want to cancel recording this time but want automatic recording reservation from the next time.

If the user has selected "cancel (502)" based on the display of the automatic recording continuation selection notification screen 500 in FIG. 5A, the recording control apparatus 100 sends an automatic recording reservation or automatic recording cancel request to the recorder 200. At this time, the recording control apparatus 100 can send control information for inhibiting change of user preference determination by the preference learning unit 220 in the recorder 200 as a variable of the automatic recording reservation or automatic recording cancel request action.

Upon receiving the control information for inhibiting change of user preference determination, the recording reservation unit 219 of the recorder 200 determines that recording of the program, which is the target of the automatic recording reservation or automatic recording cancel request, is complete, updates the "recording log information", and stores it in the memory unit 215.

As described above in the first embodiment, the preference learning unit 220 determines user preference based on the "recording log information" and "playback log information" stored in the memory unit 215. Hence, the user preference determination does not change depending on the presence/absence of the cancel operation.

According to this modification, an appropriate notification can be presented to the user by inhibiting the change of the user preference determination of the recorder.

Third Modification of First Embodiment

In the above-described first modification of the first embodiment, the time until erase of the automatic recording continuation selection notification screen 500 or 600 is decided based on the user preference information.

In the third modification, when obtained recording reservation information contains preference information, an automatic recording continuation selection notification screen including the user preference information is displayed.

In this case, in requesting the system controller 111 to display the automatic recording continuation selection notification screen in step S412, the notification necessity determination unit 121 sends the information of "program title" and "preference information" extracted from the recording reservation information table 310.

Figure 5B:
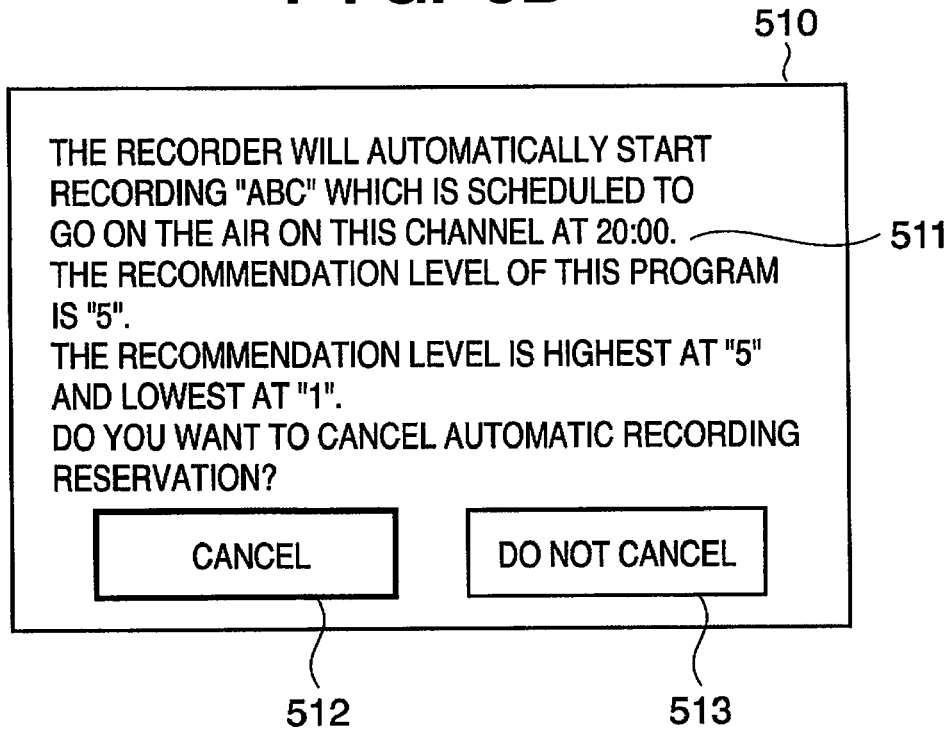
FIG. 5B is a view showing an example of an automatic recording continuation selection notification screen displayed on the video display unit 108 when "periodic operation" is determined in step S407 in FIG. 4 according to the third modification of the first embodiment.

FIG. 5B shows an example of an automatic recording continuation selection notification screen displayed on the video display unit 108 when "periodic operation" is determined in step S407 in FIG. 4. FIG. 5B shows a display example assuming that the current time is "2006/11/1 19:53", and the user is viewing a program on channel "151" in the recording control apparatus 100.

On an automatic recording continuation selection notification screen 510, an automatic recording continuation selection notification message is displayed in an area 511. The recording control apparatus 100 determines that an "automatic recording reservation" has been made for program "ABC" which is scheduled to be broadcast on channel "151 from "2006/11/1 20:00", and the preference information of the program is "5", and displays a corresponding message in the area 511. A message representing that the recommendation level is highest at "5" and lowest at "1" is displayed in the area 511 so that the user can easily grasp the recommendation level of the reserved program.

Selection buttons 512 and 513 are displayed on the lower side of the area 511. The button display inquires of the user whether to "cancel (512)" the automatic recording reservation of program "ABC" or "do not cancel (513)", and prompts him/her to select one of them.

Figure 6B:
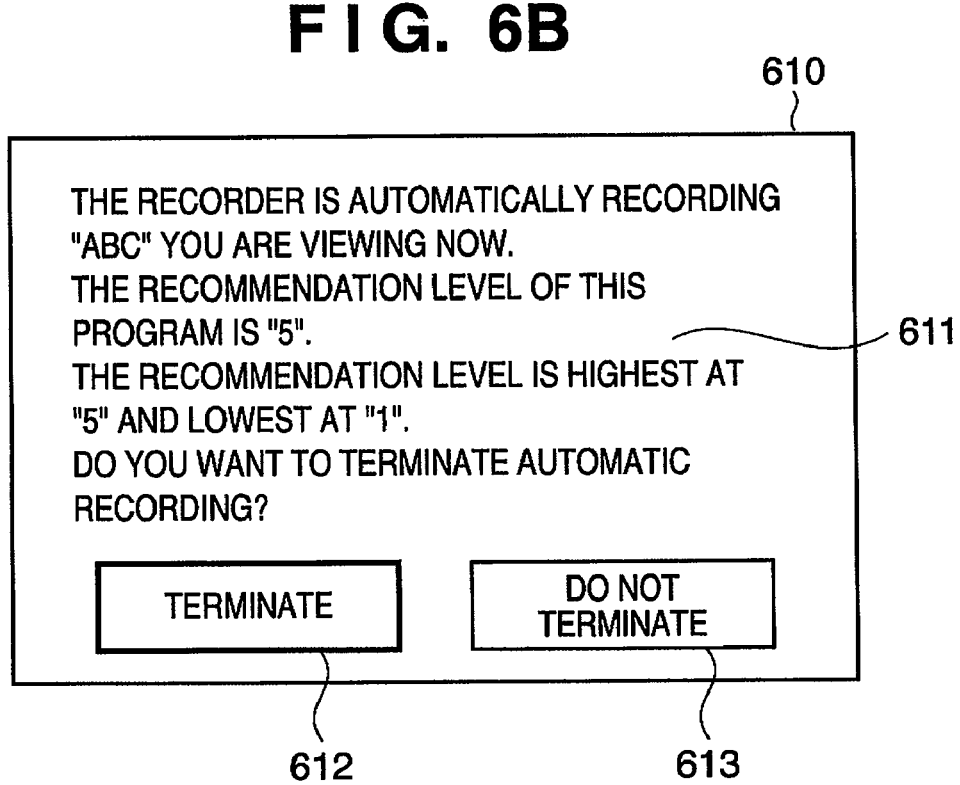
FIG. 6B is a view showing an example of an automatic recording continuation selection notification screen displayed on the video display unit 108 when "channel selection" is determined in step S407 in FIG. 4 according to the third modification of the first embodiment.

FIG. 6B is a view showing an example of an automatic recording continuation selection notification screen displayed on the video display unit 108 when "channel selection" is determined in step S407 in FIG. 4. FIG. 6B shows a display example assuming that the current time is "2006/11/1 20:05", and the user has selected a program on channel "151" in the recording control apparatus 100 and started viewing it.

On an automatic recording continuation selection notification screen 610, an automatic recording continuation selection notification message is displayed in an area 611. In this case, the recording control apparatus 100 determines that program "ABC" which is scheduled to be broadcast on channel "151 from "2006/11/1 20:00" is being recorded by "automatic recording reservation", and the preference information of the program is "5", and displays a corresponding message in the area 611. A message representing that the recommendation level is highest at "5" and lowest at "1" is displayed in the area 611 so that the user can easily grasp the recommendation level of the reserved program. Selection buttons 612 and 613 are displayed on the lower side of the area 611. The button display inquires of the user whether to "terminate (612)" recording of program "ABC" or "do not terminate (613)", and prompts him/her to select one of them.

The process of the operation in the screen 510 or 610 can be performed in the same way as described in the first embodiment.

According to this modification, the user preference information for a program reserved for automatic recording by the recorder is displayed. This allows the user to easily select and determine the operation of canceling an automatic recording reservation, terminating automatic recording, or erasing an automatically recorded program.

Second Embodiment

The second embodiment of the present invention will be described next.

Figure 7:
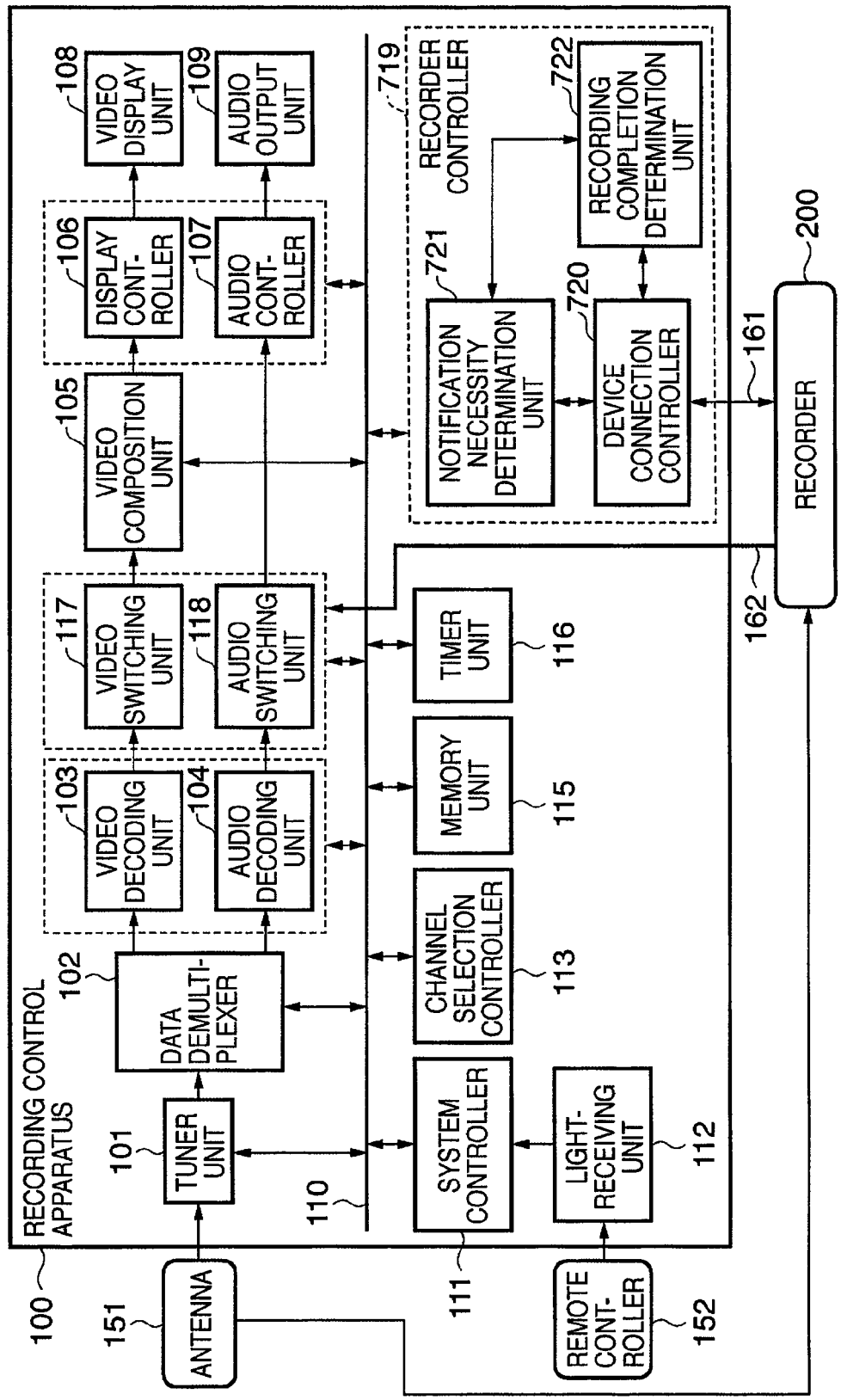
FIG. 7 is a block diagram showing an example of the arrangement of a recording control apparatus 700 and the connection arrangement with an external device according to the second embodiment of the present invention.

FIG. 7 is a block diagram showing an example of the arrangement of a recording control apparatus 700 and the connection arrangement with an external device according to this embodiment of the present invention. The same reference numerals as in FIG. 1 denote components having the same functions in FIG. 7. The recording control apparatus 100 of the first embodiment and the recording control apparatus 700 of the second embodiment are different in the following two points.

As the first difference, the recording control apparatus 700 includes a recording completion determination unit 722 having a function of determining whether program recording by a recorder 200 based on an "automatic recording reservation" is complete.

As the second difference, the recording control apparatus 700 outputs a notification based on the determination result of the recording completion determination unit 722 to inquire of a user whether to erase the program recorded by the recorder 200 based on the automatic recording reservation.

A detailed example of display of the "automatic recording continuation selection notification" and a user response to the display according to this embodiment will be described below with reference to FIGS. 8 to 10. In the following description, recording reservation information whose index 301 is "1" in a recording reservation information table 300 in FIG. 3A is obtained from the recorder 200.

Figure 8:
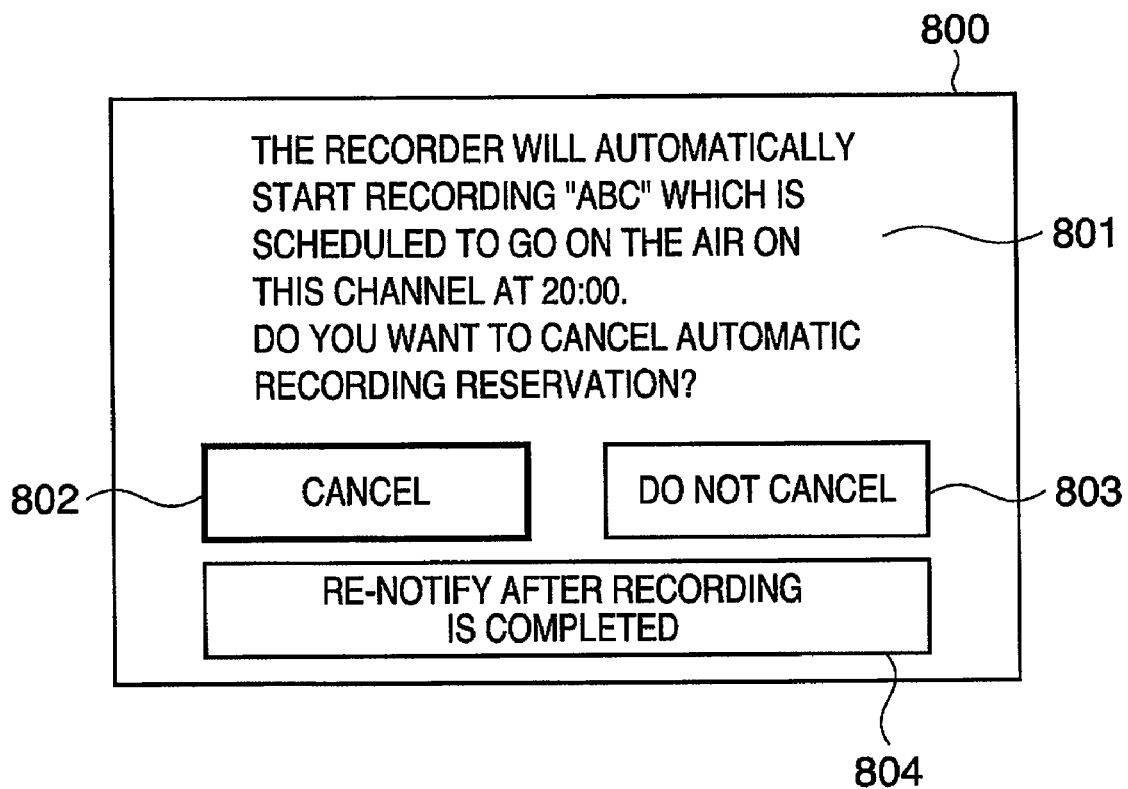
FIG. 8 is a view showing an example of an automatic recording continuation selection notification screen displayed on an video display unit 108 when "periodic operation" is determined in step S407 in FIG. 4 according to the second embodiment.

FIG. 8 is a view showing an example of an automatic recording continuation selection notification screen displayed on a video display unit 108 when "periodic operation" is determined in step S407 in FIG. 4. FIG. 8 shows a display example assuming that the current time is "2006/11/1 19:53", and the user is viewing a program on channel "151" in the recording control apparatus 700.

On an automatic recording continuation selection notification screen 800, an automatic recording continuation selection notification message is displayed in an area 801. In this case, the recording control apparatus 700 determines that an "automatic recording reservation" has been made for program "ABC" which is scheduled to be broadcast on channel "151 from "2006/11/1 20:00", and displays a corresponding message in the area 801. Selection buttons 802 to 804 are displayed on the lower side of the area 801. The button display inquires of the user whether to "cancel (802)" the automatic recording reservation of program "ABC" or "do not cancel (803)", or "re-notify after recording is completed (804)", and prompts him/her to select one of them.

On the basis of operation information corresponding to the user operation on a remote controller 152 and received via a light-receiving unit 112, a system controller 111 determines which is selected by the user, "cancel (802)", "do not cancel (803)", or "re-notify after recording is completed (804)". Upon determining that the user has selected "cancel (802)" or "do not cancel (803)", the same operation as in the first embodiment is executed.

Upon determining that the user has selected "re-notify after recording is completed (804)", the system controller 111 requests a video composition unit 105 to erase the automatic recording continuation selection notification screen 800. The system controller 111 also requests the recording completion determination unit 722 to start recording completion determination for "program ABC". Recording completion determination can be done based on current time information obtained from a timer unit 116 and the information of "scheduled recording date" and "scheduled recording start time" contained in recording reservation information obtained from the recorder 200. The recording completion determination unit 722 may be able to receive, from the recorder 200, event information representing that recording is complete.

Figure 10:
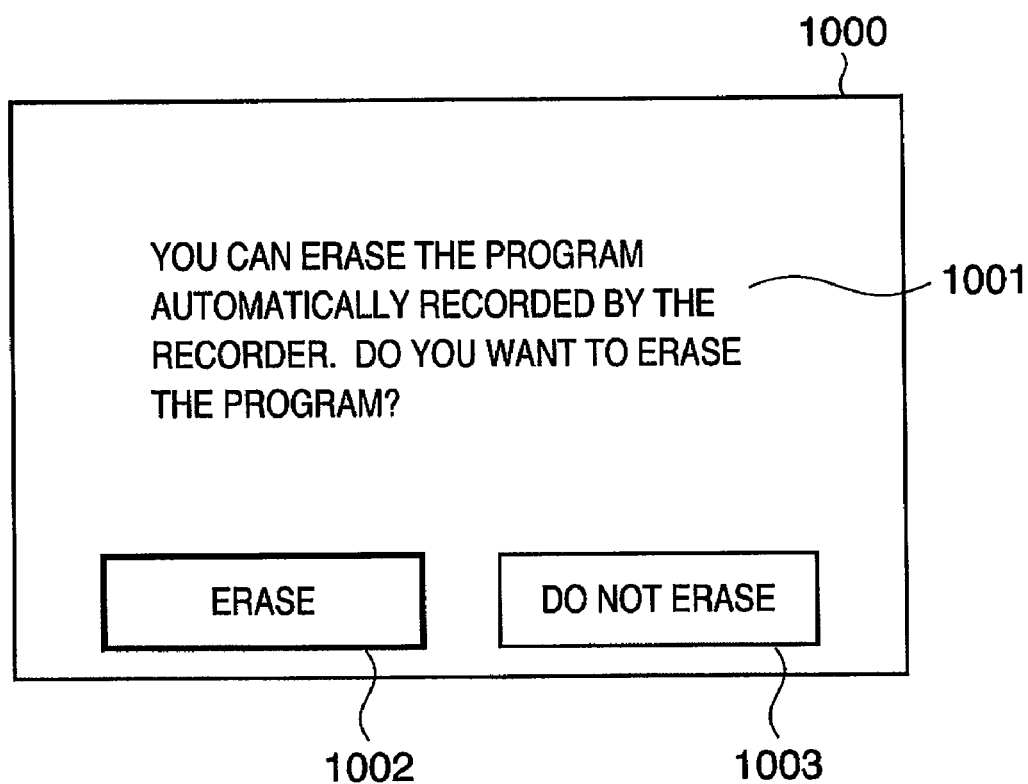
FIG. 10 is a view showing an example of an "automatically recorded program erase selection notification" screen displayed after recording completion determination according to the second embodiment.

FIG. 10 is a view showing an example of an "automatically recorded program erase selection notification" screen displayed after recording completion determination.

On an automatically recorded program erase selection notification screen 1000, a message is displayed in an area 1001 to confirm whether to erase the data of the program recorded by the recorder 200 based on automatic recording reservation. Selection buttons 1002 and 1003 are displayed on the lower side of the area 1001. The button display inquires of the user whether to "erase (1002)" the data of the program recorded by the automatic recording reservation or "do not erase (1003)", and prompts him/her to select one of them.

The system controller 111 determines which is selected by the user, "erase (1002)" or "do not erase (1003)". Upon determining that the user has selected "do not erase (1003)", the system controller 111 requests the video composition unit 105 to erase the display screen 1000 in FIG. 10, and finishes the process. On the other hand, upon determining that the user has selected "erase (1002)", the system controller 111 requests the video composition unit 105 to erase the display screen 1000 in FIG. 10. The system controller 111 also requests a recorder controller 719 to erase the recorded data, and finishes the process.

Figure 9:
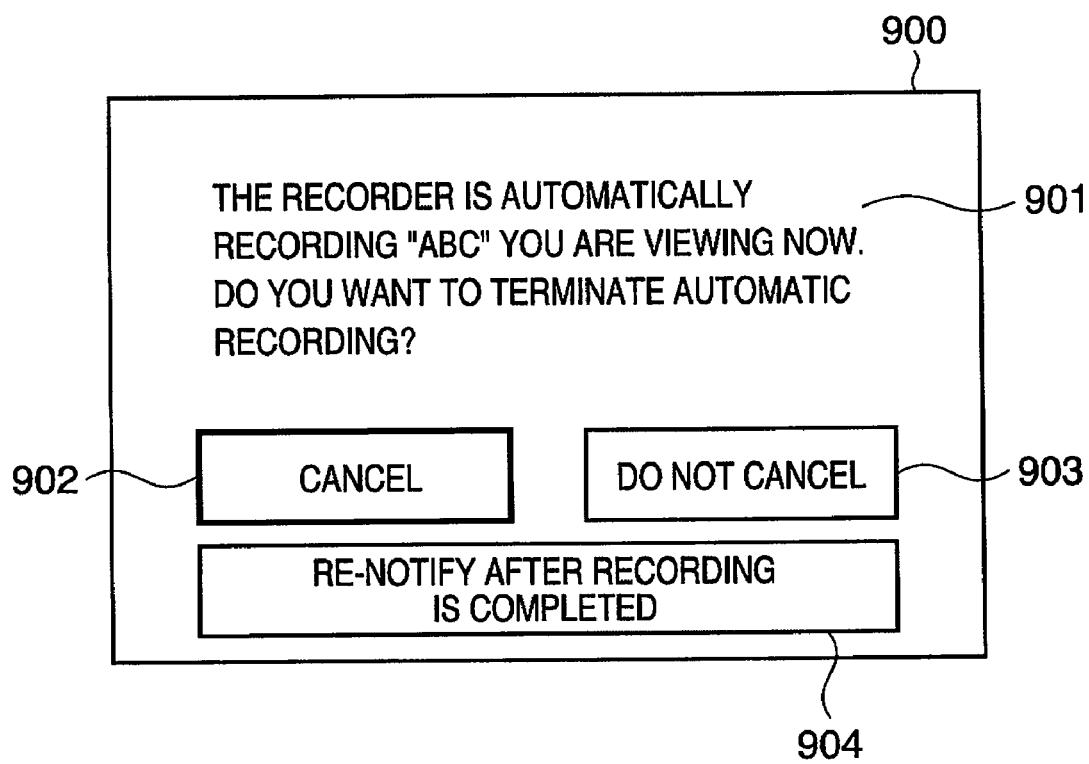
FIG. 9 is a view showing an example of an automatic recording continuation selection notification screen displayed on the video display unit 108 when "channel selection" is determined in step S407 in FIG. 4 according to the second embodiment.

FIG. 9 is a view showing an example of an automatic recording continuation selection notification screen displayed on the video display unit 108 when "channel selection" is determined in step S407 in FIG. 4. FIG. 9 shows a display example assuming that the current time is "2006/11/1 20:05", and the user has selected a program on channel "151" in the recording control apparatus 700 and started viewing it.

On an automatic recording continuation selection notification screen 900, an automatic recording continuation selection notification message is displayed in an area 901. In this case, the recording control apparatus 700 determines that program "ABC" which is scheduled to be broadcast on channel "151 from "2006/11/1 20:00" is being recorded by "automatic recording reservation", and displays a corresponding message in the area 901. Selection buttons 902 to 904 are displayed on the lower side of the area 901. The button display inquires of the user whether to "terminate (902)" recording of program "ABC" or "do not terminate (903)", or "re-notify after recording is completed (904)", and prompts him/her to select one of them.

On the basis of operation information corresponding to the user operation on the remote controller 152 and received via the light-receiving unit 112, the system controller 111 determines which is selected by the user, "terminate (902)", "do not terminate (903)", or "re-notify after recording is completed (904)". Upon determining that the user has selected "terminate (902)" or "do not terminate (903)", the same operation as in the first embodiment is executed. Upon determining that the user has selected "re-notify after recording is completed (904)", the same operation as in the display example in FIG. 8 is executed.

If no user selection response is received within a predetermined time after the display of the screen shown in FIG. 8, 9, or 10, the screen may be erased in accordance with a request sent from the system controller 111 to the video composition unit 105. For example, the screen shown in FIG. 8, 9, or 10 can be erased when no user selection response is received within 10 sec.

According to this embodiment, the user can temporarily execute reserve-recording simultaneously with viewing and, after recording is completed, decide whether to erase the automatically recorded program. This allows the user to keep the automatically recorded program when it is interesting. Additionally, since the user is re-notified after recording is completed, he/she can erase the automatically recorded program if it is not interesting.

First Modification of Second Embodiment

In the above embodiment, the recording completion determination unit 722 determines whether the recorder 200 has completed program recording based on "automatic recording reservation". Instead of the completion of recording, whether viewing of the same program as that being recorded based on "automatic recording reservation" is complete may be determined. In this case, the recording completion determination unit 722 serves as a viewing completion determination unit 722.

"Viewing is complete" indicates that broadcast of a program being viewed by the user is ended, or a predetermined time (e.g., 5 min) has elapsed after the user switched to another program. When the viewing completion determination unit 722 determines that viewing is complete, it is also possible to determine whether to erase the recorded data using the screens in FIGS. 8 to 10, and execute a process based on the determination result in the same way as described above.

According to this modification, the user can temporarily execute reserve-recording simultaneously with viewing and, after viewing is completed, decide whether to erase the automatically recorded program. This allows the user to keep the automatically recorded program when it is interesting. Additionally, since the user is re-notified after viewing is completed, he/she can erase the automatically recorded program if it is not interesting.

Second Modification of Second Embodiment

In the above-described second embodiment, the automatically recorded program erase selection notification screen 1000 is displayed every time the recording completion determination unit (viewing completion determination unit) 722 determines that automatic recording reservation (viewing of a reserved program) is complete.

However, the number of times a notification necessity determination unit 721 has determined that a notification is necessary may be counted based on the determination result of the recording completion determination unit (viewing completion determination unit) 722, and the user may be notified at once when the total count has reached a predetermined number of times.

Figure 11:
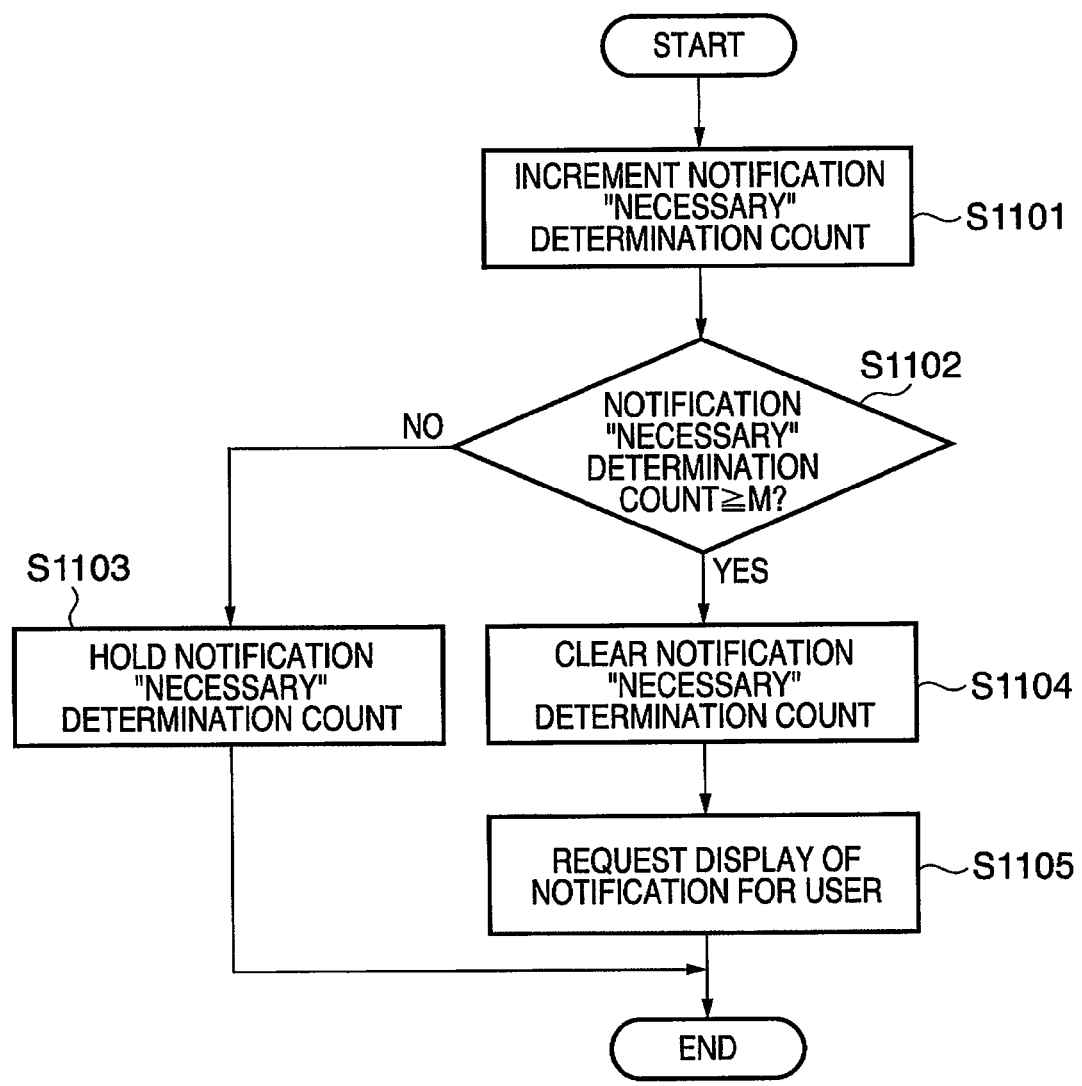
FIG. 11 is a flowchart illustrating processing according to the second modification of the second embodiment of the present invention.

A process corresponding to the second modification will be described with reference to the flowchart in FIG. 11. The process corresponding to FIG. 11 starts when the notification necessity determination unit 721 receives, from the recording completion determination unit (viewing completion determination unit) 722, a determination result representing that automatic recording (viewing of a reserved program) is complete. The respective constituent elements execute a corresponding process program, thereby implementing the process corresponding to the sequence. The process of each step in FIG. 11 will be described below.

In step S1101, the notification necessity determination unit 721 obtains, from the memory unit 115, information of the number of times the unit has determined that a notification is necessary, and increments the count information. Note that the count information is held in the memory unit 115 in step S1103 or S1104 to be described later and has an initial value "0".

In step S1102, the notification necessity determination unit 721 determines whether the number of times the unit has determined that a notification is necessary has reached a predetermined number of times (M times). The predetermined number of times (M times) can be set to, e.g., three times. If the number of times of determination has not reached the predetermined number of times ("NO" in step S1102), the process advance to step S1103. If the number of times of determination has reached the predetermined number of times ("YES" in step S1102), the process advance to step S1104.

Upon determining in step S1102 that the number of times of determination has not reached the predetermined number of times, the notification necessity determination unit 721 holds the count information in the memory unit 115 in step S1103, and finishes the process. Upon determining in step S1102 that the number of times of determination has reached the predetermined number of times, the notification necessity determination unit 721 clears the count information, i.e., resets the count to "0", and holds it in the memory unit 115 in step S1104.

In step S1105, the notification necessity determination unit 721 requests the system controller 111 to display an automatically recorded program erase selection notification screen 1200 shown in FIG. 12 on the video display unit 108.

Referring to FIG. 12, on the automatically recorded program erase selection notification screen 1200, a message is displayed in an area 1201 of the same screen to confirm whether to erase the data of three programs recorded by the recorder 200 based on automatic recording reservation. Selection buttons 1202 and 1203 are displayed on the lower side of the area 1201. The button display inquires of the user whether to "erase (1202)" the data of the programs recorded by the automatic recording reservation or "do not erase (1203)", and prompts him/her to select one of them.

The user can select recorded data of an erase target from the program information displayed in an area 1204. The area 1204 displays the recording reservation information of each recorded program. The information contains a channel 1205, program title 1206, scheduled recording date 1207, scheduled recording start time 1208, and scheduled recording end time 1209.

Hence, the user can confirm the recording reservation information and specify recorded data to be erased.

The system controller 111 determines which is selected by the user, "erase (1202)" or "do not erase (1203)". Upon determining that the user has selected "do not erase (1203)", the system controller 111 requests the video composition unit 105 to erase the display screen 1200 in FIG. 12, and finishes the process. On the other hand, upon determining that the user has selected "erase (1202)", the system controller 111 requests the video composition unit 105 to erase the display screen 1200 in FIG. 12. The system controller 111 also requests the recorder controller 719 to erase the recorded data selected in the area 1204. A device connection controller 720 (third indicate unit) in the recorder controller 719 sends, to the recorder 200, a request for erasing the selected recorded data, and finishes the process.

According to this modification, notifications corresponding to a plurality of number of times are presented at once. This reduces the number of times of notifications for the user and further suppresses the occurrence of cases in which the user feels distracted by notifications.

Third Embodiment

The above-described embodiments have exemplified arrangements including a recording control apparatus connected to a recorder by a UPnP network via an Ethernet®. The connection arrangement is not limited to this. The present invention can also be achieved by any other connection arrangement capable of controlling communication between a device and an IEEE1394, HDMI, or USB and exchanging information between the devices.

In the above-described embodiments, the recording reservation information shown in FIG. 3A, 3B, or the like may contain a program content explanation or program genre information.

In the above-described embodiments, the "program title" of a program reserved by an automatic recording reservation is displayed in the "automatic recording continuation selection notification" screens shown in FIGS. 5A, 5B, 6A, 6B, 8, and 9. However, pieces of program information except the program title, including a program content explanation, channel, broadcast time information, and program genre information, may be combined and displayed together. In this case, the system controller 111 which generates the graphic data of the "automatic recording continuation selection notification" screen obtains program information to be displayed from the memory unit 115 based on "program title" information received from the notification necessity determination unit according to each embodiment.

Similarly, a program content explanation or program genre information may be displayed in the "automatically recorded program erase selection notification" screens shown in FIGS. 10 and 12. In this case as well, the system controller 111 obtains program information to be displayed from the memory unit 115 based on "program title" information received from the notification necessity determination unit according to each embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-098684, filed Apr. 4, 2007, which is hereby incorporated by reference herein in its entirety.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A recording control apparatus for controlling execution of recording of broadcast program data in a recording apparatus, comprising:
    a channel selection acceptance unit configured to accept a channel selection from a user;
    a display controller configured to control a display unit to display program data which is selected among received program data via broadcast signal and is corresponding to the channel selection accepted by said channel selection acceptance unit;
    an obtaining unit configured to obtain reserve-recording information to be executed by the recording apparatus;
    an extraction unit configured to extract first reserve-recording information from the reserve-recording information obtained by said obtaining unit, wherein the reserve-recording information includes the first reserve-recording information relating to a program data, the recording of which is automatically reserved based on a predetermined condition and second reserve-recording information relating to a program data, the recording of which is manually reserved by a user, and
    a determination unit configured to determine whether or not the program displayed on the display unit corresponds to a program according to the first reserve-recording information,
    wherein when said determination unit determines that the program displayed on the display unit is equal to a program according to the first reserve-recording information, said display controller controls the display unit to display a query screen to inquire of the user whether to erase recorded data corresponding to the first reserve-recording information in the recording apparatus after recording of the program according to the first reserve-recording information starts.

2. The apparatus according to claim 1, wherein said display controller controls the display unit to display the query screen in response to completion of recording according to the first reserve-recording information in the recording apparatus.

3. The apparatus according to claim 1, wherein said display controller controls the display unit to display the query screen in response to the user switching from a channel of the program displayed on the display unit to another channel during recording according to the first reserve-recording information.

4. The apparatus according to claim 1, wherein
said recording control apparatus is connected to the recording apparatus, and
said obtaining unit further configured to obtain the reserve-recording information to be executed by the recording apparatus from the recording apparatus.

5. The apparatus according to claim 1, wherein the program data for which the recording is automatically reserved based on a predetermined condition is such program data that is identical to a user preference.

6. A control method of a recording control apparatus for controlling execution of recording of broadcast program data in a recording apparatus, comprising:
accepting a channel selection from a user;
displaying on a display unit of program data which is selected among received program data via a broadcast signal and is corresponding to the accepted channel selection;
obtaining reserve-recording information to be executed by the recording apparatus;
extracting first reserve-recording information from the reserve-recording information obtained in said obtaining, wherein the reserve-recording information includes the first reserve-recording information relating to a program data, the recording of which is automatically reserved based on a predetermined condition and second reserve-recording information relating to a program data, the recording of which is manually reserved by a user;
determining whether or not the program displayed on the display unit corresponds to a program according to the first reserve-recording information; and
displaying on the display unit of a query screen to inquire of the user whether to erase recorded data corresponding to the first reserve-recording information in the recording apparatus, when it is determined that the program displayed on the display unit is equal to a program according to the first reserve-recording information after recording of the program according to the first reserve-recording information starts.

7. The method according to claim 6, wherein the display unit displays the query screen in response to completion of recording according to the first reserve-recording information in the recording apparatus.

8. The method according to claim 6, wherein the display unit displays the query screen in response to the user switching from a channel of the program displayed on the display unit to another channel during recording according to the first reserve-recording information.

9. The method according to claim 6, wherein
said recording control apparatus is connected to the recording apparatus, and
in said obtaining, the reserve-recording information to be executed by the recording apparatus is obtained from the recording apparatus.

10. The control method according to claim 6, wherein the program data for which the recording is automatically reserved based on a predetermined condition is such program data that is identical to a user preference.

* * * * *